United States Patent Office 3,489,077
Patented Jan. 13, 1970

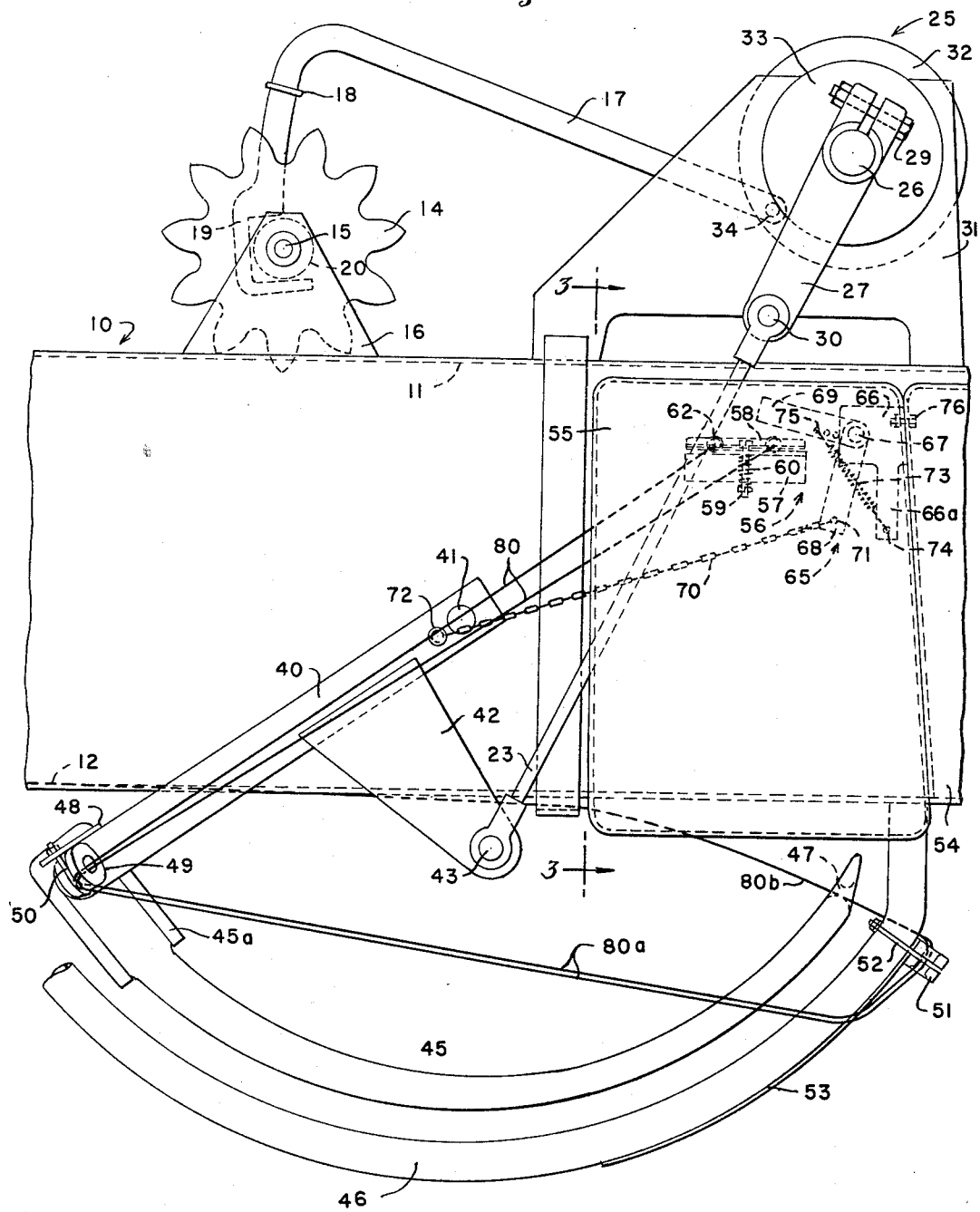

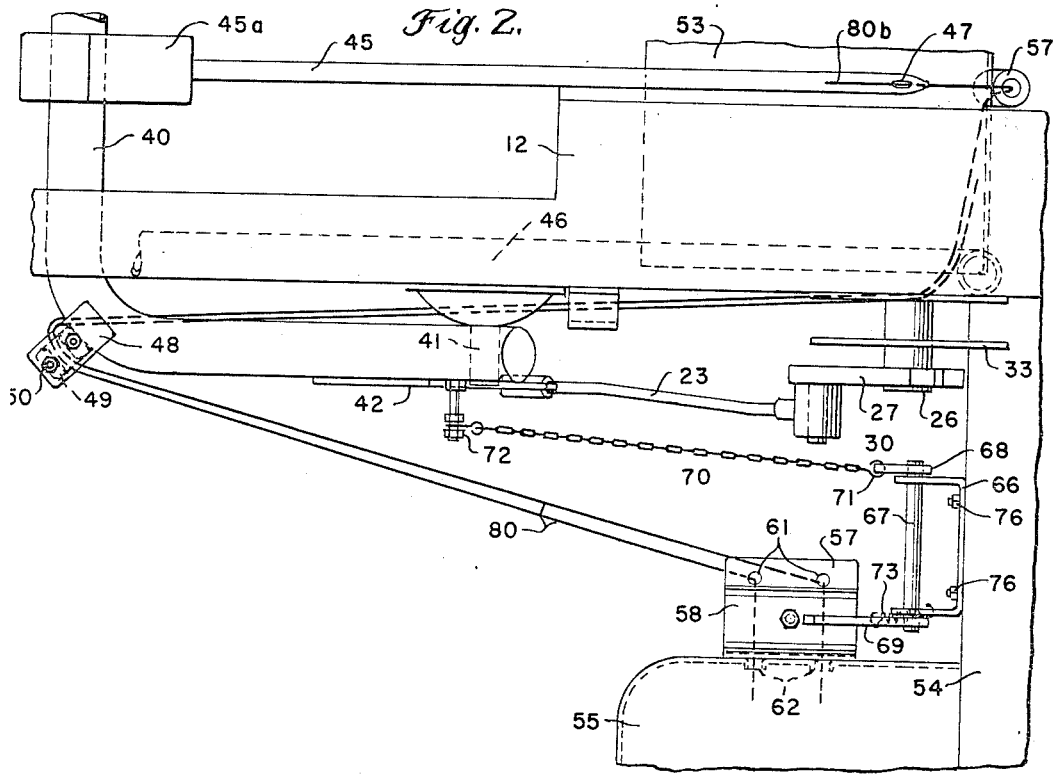
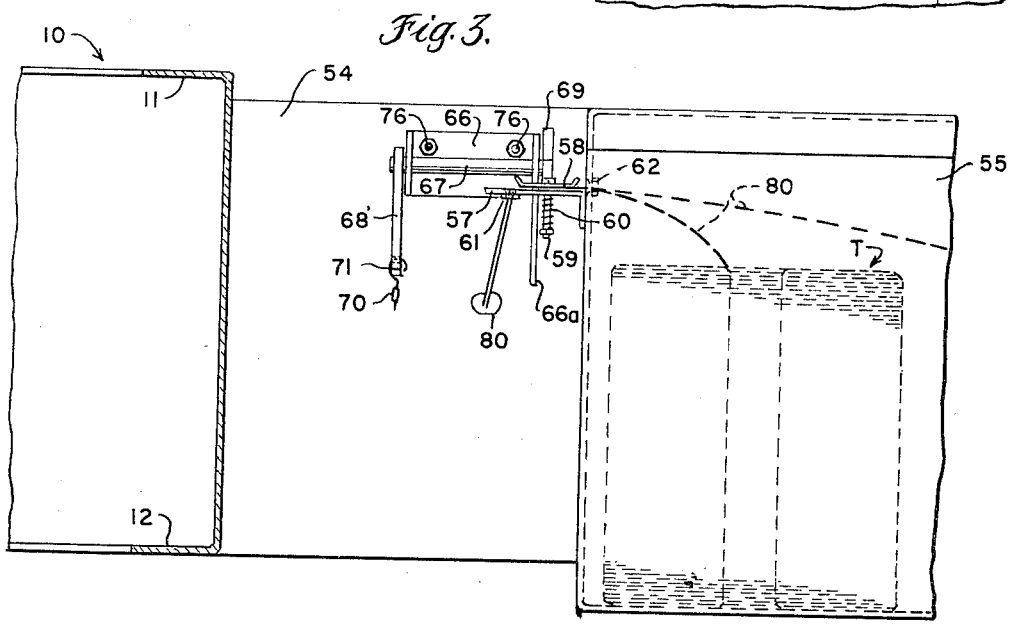

3,489,077
TWINE TENSIONING ATTACHMENT
Edwin B. Nolt, New Holland, and Richard R. Eby, Ephrata, Pa., assignors to Sperry Rand Corporation, New Holland, Pa., a corporation of Delaware
Filed Mar. 18, 1968, Ser. No. 713,944
Int. Cl. B65b 13/06
U.S. Cl. 100—19   5 Claims

ABSTRACT OF THE DISCLOSURE

A twine tensioning attachment for a baling machine, comprised of a lever means, mounted adjacent a friction device disposed on a twine box, which lever means is operably connected to a needle yoke for selective engagement with the friction device in response to movement of the needle yoke, whereby increased tension is applied to baler twine passing through the friction device as the needles are delivered to and return from the knotter mechanism.

BACKGROUND OF THE INVENTION

This invention relates generally to a twine tensioning attachment for a baling machine, and specifically to an attachment capable of applying increased tension to baler twine carrier by a needle as the needle traverses a bale case toward a knotter mechanism and returns to a home position after a knot tying operation.

During the twine tying or knotting operation of a baling machine, one end of the twine, the so called number one strand, is held in a twine holder of the knotter mechanism. The twine strand then runs downwardly from the holder through the bale case to a needle, pivotally suspended below the bale case, through the needle eye, and then to the twine box and the supply spool carried therein. As a bale is formed in the bale case, the twine extending across the bale case between the twine holder and the needle is forced ahead of the forming bale in sharp jerks each time a hay charge is forced rearwardly in the bale case by a reciprocating plunger. Because of the jerks on the strand, the twine has a tendency to tangle or break and it is, therefore, important that tension be applied to the twine at this stage of the baling operation.

When the bale has been completely formed, the needle is actuated to travel upwardly through the bale case behind the newly formed bale carrying with it the strand of twine, the so called number two strand, which passes through the needle eye. The needle travels to a twine holder portion of a knotter mechanism where the twine carried thereto is grasped so that both ends of the twine looped around the new bale are held therein. Immediately upon grasping the twine in the holder, a twine finger, operating in timed relation with the needle, engages the needle carried number two strand and pulls it toward a billhook device of the knotter mechanism. Both ends of the twine are now against the billhook and it starts to rotate to form the knot therewith. It is essential that proper tension be applied to the twine at the time the needle carries the twine to the holder to be gripped thereby and as the twine strand, the so called number three strand, is pulled back through the bale case after the tying operation. Without the tension being applied to the number three strand, which then becomes the number one strand, it has been found that the strand will not pull down soon enough after delivery of the number two strand to the knotter by the needle for the knotter to make a good knot. Such a condition may cause the knotter to fail to tie a knot and an untied bale will consequently be discharged from the machine.

While certain prior art attempts have been made to provide tensioning means for the number three strand for this purpose on hay balers, these attempts have not always been as successful as desired. Prior art designs are rather complex making them expensive to manufacture and install.

SUMMARY OF THE INVENTION

Accordingly, the present invention provides a simple tensioning attachment which is capable of providing additional necessary tension to the baler twine during the knot tying operation. To this end, tension will be applied to the number three strand by the actuation of a spring biased lever means in response to movement of the needle yoke, such that the lever means will engage a resilient friction means, increasing the tension applied thereby to a twine strand being drawn therethrough, as the needle ascends to the knotter mechanism and descends to the home position on its return stroke. Only normal tension is applied to the twine while the needle is in the rest position.

DESCRIPTION OF THE DRAWINGS

FIGURE 1 is a fragmentary side elevation of a hay baler illustrating the twine tensioning attachment constructed in accordance with the invention;

FIGURE 2 is a plan view of the tensioning attachment shown in FIGURE 1; and

FIGURE 3 is a view taken in the direction of the arrows 3—3 shown in FIGURE 1.

FIGURE 1 of the drawing shows a bale case 10, having a top and a bottom wall 11 and 12, respectively. The bale case has a plunger (not shown) reciprocable therein. Mounted above the bale case, on a shaft 15 supported by pedestal bearings 16, is a metering wheel 14 which extends downwardly into the bale case through suitable openings (not shown) in the top wall 11 for engagement with a bale (not shown) being formed in the case. The wheel 14 is connected intermediate shaft 15 for rotation therewith.

An L-shaped trip arm 17 is provided with a collar 18 and a hooked portion 19 at one end and a pivoted connection 34 to a disk 32 at the other end. The L-shaped hooked end 19 is adapted to extend over and against a trip roller 20 also disposed on shaft 15. As the wheel 14 is rotated in response to bale movement in the bale case, the roller 20 is correspondingly rotated. This rotation of roller 20 imparts a lifting motion to the trip arm 17, causing the hooked end portion 19 to assume a position, shown in FIGURE 1, straddling roller 20. The trip arm is adapted to be shifted forwardly (to the right in FIGURE 1), by spring means (not shown) and disk 27 is rotated. The rotation of disk 27 causes the engagement of a one revolution clutch means, generally designated at 25.

The clutch means 25 is disposed on a horizontal timer shaft 26 which is rotatably supported by pedestal bearings 31 mounted on the upper surface of top wall 11. A crank arm 27 and a disk 33 are connected for rotation to one end of shaft 26, with crank arm 27 being secured by means of a clamp bolt 29, or by any other suitable means, as shown in FIGURES 1 and 2. A rod element 23 is pivotally connected by one end at 30 to the end of crank arm 27, as shown in FIGURES 1 and 2. The other end of rod 23 is pivotally connected at 43 to a plate 42.

The plate 42 is tangentially secured by suitable means (not shown), to yoke 40, shown in FIGURES 1 and 2 of the drawings. The tubular yoke 30 is a substantially U-shaped member, the bight of which extends parallel to the bottom wall 12 of the bale case and the legs extend parallel to the side walls. Yoke 30 is pivotally connected to bale case 10 as at 41. A pair of arcuate needles 45 (only one shown) may be connected to the yoke 40 by suitable mounting means 45a, shown in FIGURES 1 and 2. Each needle 45 is protected by an arcuate guard member 46 which is connected at both ends to the under surface of bottom wall 12. A ceramic twine guide or eye 51 is clamped to the guard 46 and a guard plate or shield 53, extending between the guards 46, by a bolt 52.

A twine box 55 is mounted rearwardly of feeder case 54 by means not shown. A resilient friction means 56 is mounted on one side wall of the twine box 55, as shown in FIGURES 1, 2 and 3. The resilient friction means 56 is comprised of an L-shaped bracket 57 mounted on twine box 55, a clamp plate 58, a retaining bolt 59, a spring 60 mounted on bolt 59 for urging the clamping plate 58 toward bracket 57, and apertures 61 in the L-shaped bracket 57 adjacent the outer edge thereof. The twine box 55 is provided with apertures 62 in the side thereof, above and adjacent the bracket, so that twine strands 80 being unwound from spools T, shown in FIGURE 3, pass outwardly through apertures 62, under clamp plate 58 and through apertures 61 toward the needles.

The resilient friction means 56 provides a constant tension on strands 80 as they pass from the twine box to ceramic guide element 49 suspended below a plate 48 fixed to yoke 40 by means of a U-bolt 50. From guide 49, the strands 80a are directed to a second guide means 51 fixed to guard 46, and thence through an eye 47 in needle 45, along the bottom of wall 12 (see strand 80b in FIGURE 1), upwardly through the bale case to a twine holder (not shown).

A twine tensioning means 65 is comprised of a generally U-shaped bracket 66, having a depending leg portion 66a fixed to one outwardly extending arm of the bracket, a shaft 67 rotatably supported by bracket 66, a lever means fixed to the shaft including a first lever 68 mounted at one end of shaft 67 and a second lever 69 mounted at the other end of the shaft 67, connecting means 70 and a biasing means 73. The connecting means 70, in this instance, is shown as a chain which extends between a connection at 71 on downwardly extending lever 68 and connection at 72 on yoke 40. The biasing means, or spring, 73 extends between connection at 74 on leg portion 66a and connection at 75 on generally horizontally extending lever 69. The bracket is mounted on the rear wall of feeder case 54 by mounting bolts 76, as shown in FIGURES 1, 2 and 3.

In operation, the tensioning means 65 is positioned, as shown in FIGURE 1, with lever 69 out of engagement with clamp plate 58 when the needles are in the rest or home position and a new bale is being formed in the bale case. Twine is drawn from supply spools T under tension applied by friction means 56, the guides 49 and 51 and needle eye 47. Once the bale (not shown) has been completely formed, the needle yoke is tripped in response to rotation of metering wheel 14 which actuates the clutch means 25 causing the needle 45 to traverse bale case 10 toward the knotter mechanism (not shown) located on shaft 26. As the yoke begins to pivot about the bale case, chain 70 goes slack so that the levers 68 and 69 are caused to pivot on shaft 67 under the bias of spring 73, which tends to rotate the levers toward the bracket, such that lever 69 engages the clamp plate 58 of the resilient friction means 56 urging the plate with increased force toward bracket 57. As can be understood, the lever 69 will remain in engagement with plate 58 as the needles traverse the bale case to and from the knotter mechanism (not shown) during the operation thereof. In this manner, an increased tension is applied to the number two and three twine strands during the knot tying operation, but not during the bale formation period. During the bale forming operation, the strands are pulled from the twine box with only the drag applied by friction means 56. This embodiment assures that unwanted bale twine slack is not delivered to the newly formed bale as the needle draws the number two strand upwardly to the knotter.

Having thus described our invention, what we claim is:

1. A twine tensioning attachment for use in a baling machine comprising, a bale case having a top and bottom wall, a feeder case extending transversely of said bale case, a metering wheel on said bale case and extending into said bale case for rotatable engagement with a bale being formed therein, a yoke member pivotally connected to said bale case, a needle, having an eye therein, connected to said yoke member for pivotal movement therewith with respect to said bale case, a twine box mounted rearwardly of said feeder case, resilient friction means on said twine box for normally engaging and applying tension to twine as it passes therethrough, the twine being drawn from said twine box, tensioning means pivotally mounted on said feeder case adjacent said resilient friction means and operable in response to movement of said yoke to apply increased tension to baling twine through engagement with said resilient friction means forcing said resilient friction means tighter against the twine as said needle passes upwardly through said bale case and back again, and means on said bale case connected to said metering wheel and said yoke for actuating said needle in response to movement of said metering wheel.

2. A twine tensioning attachment as described in claim 1, wherein said tensioning means is comprised of a bracket mounted on said feeder case, a shaft supported by said bracket, lever means connected to said shaft, biasing means between said lever means and said bracket for urging said lever means toward said bracket, and means connecting said lever means to said yoke whereby increased tension is applied to the twine passing through said resilient friction means as said lever means engages said resilient friction means in response to movement of said yoke.

3. A twine tensioning attachment as described in claim 1, wherein said tensioning means is comprised of a generally U-shaped bracket mounted on said feeder case, a shaft supported by said bracket and pivotal with respect thereto, lever means including first and second levers connected to said shaft, said second lever being selectively engageable with said friction means, biasing means between said second lever and said bracket for urging said second lever means toward said bracket, and means connecting said first lever to said yoke member, whereby said tensioning means is actuated in response to movement of said yoke.

4. A twine tensioning attachment as described in claim 1, wherein said tensioning means is comprised of a generally U-shaped bracket having a leg portion extending downwardly from said bracket, a shaft supported by said bracket and pivotal with respect thereto, lever means including first and second levers, said first lever connected to one end of said shaft, said second lever connected to the other end of said shaft and selectively engageable with said friction means, biasing means between said second lever and said leg portion of said bracket for urging said lever means toward said bracket, and means connecting said first lever to said yoke member, whereby said tensioning means is actuated in response to movement of said yoke.

5. A twine tensioning attachment for use in a baling machine comprising, a bale case having a top and bottom wall, a feeder case extending transversely of said bale case, a metering wheel on said bale case and extending into said bale case for rotatable engagement with a bale being formed therein, a U-shaped yoke member pivotally connected to said bale case, a needle, having an eye therein, connected to said yoke member for pivotal movement therewith with respect to said bale case, a twine box mounted rearwardly of said feeder case, resilient friction means on said twine box for engaging twine as it passes therethrough, the twine being drawn from said twine box, tensioning means mounted on said feeder case, adjacent said resilient friction means, said tensioning means comprised of a generally U-shaped bracket having a leg portion extending downwardly from one outwardly extending arm of said bracket, a shaft rotatably supported by said bracket, lever means including first and second levers, said first lever connected to one end of said shaft, said second lever connected to the other end of said shaft and selectively engageable with said friction means, biasing means between said second lever and said leg portion of said bracket for urging said lever means toward said bracket, means connecting said first lever to said yoke member, and means on said bale case connected on said metering wheel and said yoke for actuating said needle in response to movement of said metering wheel, whereby said tensioning means is actuated in response to movement of said yoke.

References Cited

UNITED STATES PATENTS

| | | | |
|---|---|---|---|
| 1,213,993 | 1/1917 | Zachow | 100—19 |
| 2,346,786 | 4/1944 | Radeck | 100—21 XR |
| 2,470,724 | 5/1949 | Ronning et al. | 100—19 XR |
| 2,731,909 | 1/1956 | Rudeen | 100—22 |
| 2,781,719 | 2/1957 | Hedtke | 100—19 |
| 2,897,747 | 8/1959 | May | 100—4 |
| 2,917,993 | 12/1959 | Nikkel | 100—21 XR |

FOREIGN PATENTS

| | | |
|---|---|---|
| 215,299 | 5/1961 | Austria. |
| 1,106,544 | 5/1961 | Germany. |
| 152,315 | 7/1953 | Australia. |

BILLY J. WILHITE, Primary Examiner